(12) United States Patent
Bue et al.

(10) Patent No.: US 7,526,533 B1
(45) Date of Patent: Apr. 28, 2009

(54) ACTIVE CALL CONTEXT RECONSTRUCTION FOR PRIMARY/BACKUP RESOURCE MANAGER SERVERS

(75) Inventors: Brian Lo Bue, Irvine, CA (US); Darrell Myers Shively, II, Irvine, CA (US); Larry Nadeau, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/452,285

(22) Filed: Nov. 30, 1999

(51) Int. Cl.
*G06F 13/00* (2006.01)
(52) U.S. Cl. ............... 709/220; 709/224; 709/226; 714/4; 714/6
(58) Field of Classification Search ............... 709/200, 709/203, 208, 216, 218, 222, 226, 228, 224, 709/232, 234, 201, 220, 227; 370/10, 5, 370/229; 710/105; 714/4, 13, 15
See application file for complete search history.

(56) References Cited

U.S. PATENT DOCUMENTS

| | | | |
|---|---|---|---|
| 4,827,411 A | 5/1989 | Arrowood et al. | 364/300 |
| 5,241,594 A | 8/1993 | Kung | 380/4 |
| 5,305,448 A | 4/1994 | Insalaco et al. | 712/24 |
| 5,345,445 A | 9/1994 | Hiller et al. | 370/60.1 |
| 5,345,446 A | 9/1994 | Hiller et al. | 370/60.1 |
| 5,365,524 A | 11/1994 | Hiller et al. | 370/94.2 |
| 5,390,175 A | 2/1995 | Hiller et al. | 370/60 |
| 5,394,394 A | 2/1995 | Crowther et al. | 370/60 |
| 5,408,472 A | 4/1995 | Hluchyj et al. | 370/94.1 |
| 5,428,607 A | 6/1995 | Hiller et al. | 370/60.1 |
| 5,452,297 A | 9/1995 | Hiller et al. | 370/60.1 |
| 5,452,448 A | 9/1995 | Sakuraba et al. | 712/246 |
| 5,513,351 A | 4/1996 | Grantz | 712/246 |
| 5,515,502 A * | 5/1996 | Wood | 714/15 |
| 5,526,489 A | 6/1996 | Nilakantan et al. | 395/200.02 |
| 5,539,883 A * | 7/1996 | Allon et al. | 718/105 |
| 5,564,051 A | 10/1996 | Halliwell et al. | 712/246 |
| 5,608,898 A | 3/1997 | Turpin et al. | 712/248 |
| 5,634,052 A * | 5/1997 | Morris | 707/1 |
| 5,655,077 A | 8/1997 | Jones et al. | 713/201 |
| 5,671,350 A * | 9/1997 | Wood | 714/15 |
| 5,671,354 A | 9/1997 | Ito et al. | 709/203 |
| 5,684,950 A | 11/1997 | Dare et al. | 713/201 |
| 5,696,895 A * | 12/1997 | Hemphill et al. | 714/4 |
| 5,701,457 A | 12/1997 | Fujiwara | 709/203 |
| 5,764,736 A | 6/1998 | Shachar et al. | 379/93.09 |
| 5,764,756 A | 6/1998 | Onweller | 379/242 |
| 5,774,660 A * | 6/1998 | Brendel et al. | 709/201 |
| 5,787,247 A * | 7/1998 | Norin et al. | 709/205 |

(Continued)

OTHER PUBLICATIONS

Cisco System, Network Wide Solution Manages Providers to Maximize Revenue from Dial VPN, Apr. 5, 1999, 1-3.*

*Primary Examiner*—Khanh Q Dinh
(74) *Attorney, Agent, or Firm*—Patent Capital Group (57) ABSTRACT

A method and apparatus for network server recovery maintains an ongoing call by reconstructing its call context from a server-state attribute (SSA) that is generated by a first server, recorded in separate storage and retrieved by a second server in the event that a connection to the first server is interrupted. The SSA encodes call data that can be used to enable a server to maintain the call. The separate storage is preferably associated with a network access server (NAS) that does not itself use the SSA.

26 Claims, 5 Drawing Sheets

U.S. PATENT DOCUMENTS

| | | | |
|---|---|---|---|
| 5,815,665 A | 9/1998 | Teper et al. | 709/201 |
| 5,826,253 A | 10/1998 | Bredenberg | 707/2 |
| 5,832,240 A * | 11/1998 | Larsen et al. | 710/105 |
| 5,838,683 A | 11/1998 | Corley et al. | 370/408 |
| 5,933,625 A | 8/1999 | Sugiyama | 709/205 |
| 5,944,824 A | 8/1999 | He | 713/201 |
| 5,953,336 A | 9/1999 | Moore et al. | 370/395 |
| 5,991,810 A | 11/1999 | Shapiro et al. | 709/229 |
| 6,011,910 A | 1/2000 | Chau et al. | 709/201 |
| 6,012,087 A * | 1/2000 | Freivald | 709/218 |
| 6,058,424 A * | 5/2000 | Dixon et al. | 709/226 |
| 6,092,196 A | 7/2000 | Reiche | 713/200 |
| 6,119,160 A | 9/2000 | Zhang et al. | 709/224 |
| 6,185,598 B1 * | 2/2001 | Farber et al. | 709/200 |
| 6,424,999 B1 * | 7/2002 | Arnon et al. | 709/208 |
| 6,434,681 B1 * | 8/2002 | Armangau | 711/162 |
| 6,539,494 B1 * | 3/2003 | Abramson et al. | 714/4 |
| 6,690,651 B1 * | 2/2004 | Lamarque et al. | 370/252 |
| 2005/0131990 A1 * | 6/2005 | Jewell | 709/201 |

* cited by examiner

FIG. 1 (prior art)

(prior art)

ACTIVE CALL CONTEXT RECONSTRUCTION FOR PRIMARY/BACKUP RESOURCE MANAGER SERVERS

FIELD OF THE INVENTION

The present invention relates to a method and apparatus to reconstruct an interrupted user's network connection from an updated data string held in storage by the network server.

BACKGROUND OF THE INVENTION

Computer networks have developed into an integral part of society and the economy. Network users obtain access from their host computer with dial-up capability to another computer with which to communicate through a variety of systems currently available. A user transmits a request or call from an access point across a medium to the remote site. The call will be identified by selected attributes in an access request data packet that may be used by the network accounting management. To facilitate access by authorized call-in users and network subscribers, a variety of network servers have been developed that may include computer hardware, software and/or firmware. These servers are frequently designed to handle specific tasks within the network and operate with a dedicated database. A call-in user may thus be dependent on more than one server for continued access to the network, and if one server fails while others continue to operate, the user may nonetheless be disconnected from the network and be forced to establish a new connection even though the network remains active.

The time consumed from repeated interruptions can lead to diminished productivity and severe frustration if critical data are denied or corrupted due to a recalcitrant server. Consequently, network administrators have sought to address this and other concerns by ensuring high reliability for servers and establishing backup systems. However, a backup server without access to the call's status from the identification in the data packet may be unable to maintain a previously established call, resulting in the call being cut off. Consequently, aside from efforts to ensure high reliability of servers, the industry also requires a backup system with the ability to hand-off a call-in user's network connection from a server that has failed to a backup server by ensuring that call identification information is received by a backup server in a timely fashion.

A connection from an access point to a network at a point of presence (PoP) may be maintained by an internet service provider (ISP) or a telephone company using communications media such as a public switched telephone network (PSTN), integrated services digital network (ISDN), or a cable television system, using one of several available mechanisms or protocols. Such protocols include the decentralized Institute of Electrical & Electronic Engineers (IEEE) standard 802.3 called Ethernet™, the token ring IEEE standard 802.5 incorporating a special bit-pattern to control transmission order, the asynchronous digital subscriber line (ADSL) under the American National Standards Institute (ANSI) T1.413 standard, the hybrid fiber coax (HFC) used by cable television providers, or others as is well known in the art. An access point may contain a variety of server types for particular functions. These types include the authentication, authorization and accounting (AAA) server, the network access server (NAS), the resource pool manager server (RPMS), the home gateway router (HGR), the digital subscriber line aggregation multiplexer (DSLAM), along with many others well known in the art.

A call-in user seeking a connection to the network may place a call across telephone lines or other media to a NAS through a particular port of the NAS, such as a modem port or ISDN port. The NAS answers the call, becoming coupled to the user, and sends the call type and dialed number information service (DNIS) information to the RPMS, which matches the combination to a call discrimination table and compares the network resources available to the session counts. Call types include speech, digital and others known in the art. The call is rejected if the call type-DNIS combination appears in the call discrimination table. If the customer profile session limits exceed threshold values, the call may be rejected or assigned a busy signal. If the call is accepted, it is assigned to the NAS that answered it. A RPMS may provide resource management, dial services and call discrimination for a regional PoP or for a NAS connected to multiple ports.

A RPMS enables telephone companies and ISPs to count, control, manage and provide accounting data on shared resources for wholesale virtual private dial-up network (VPDN) and retail dial network services across one or more NAS stacks. By tracking threshold access limits, the RPMS verifies to the NAS that there exist sufficient network resources to enable a user calling in to become connected to the network (provided that the user has authorization). An illustration of the logic used by a RPMS can be seen in the flow diagram 10 of FIG. 1. An input 12 containing call type-DNIS information is provided to a call discriminator query 14, which compares the information to a series of discriminators implemented as a call discrimination table. If the call matches the table, it is unauthorized and the call is treated to rejection 16. If no match is found, the DNIS customer profile is queried 18, and if none is found, a default profile is queried 20. If no default match is found, the call may be rejected 22. If the DNIS customer profile exists after query 18, the connection threshold is queried 24, and if not reached, or if a default customer match is found in the default query 20, then the number of resources is queried 26. If sufficient resources are available, the call may be answered 28, whereupon the VPDN group is verified 30.

Figure 1:
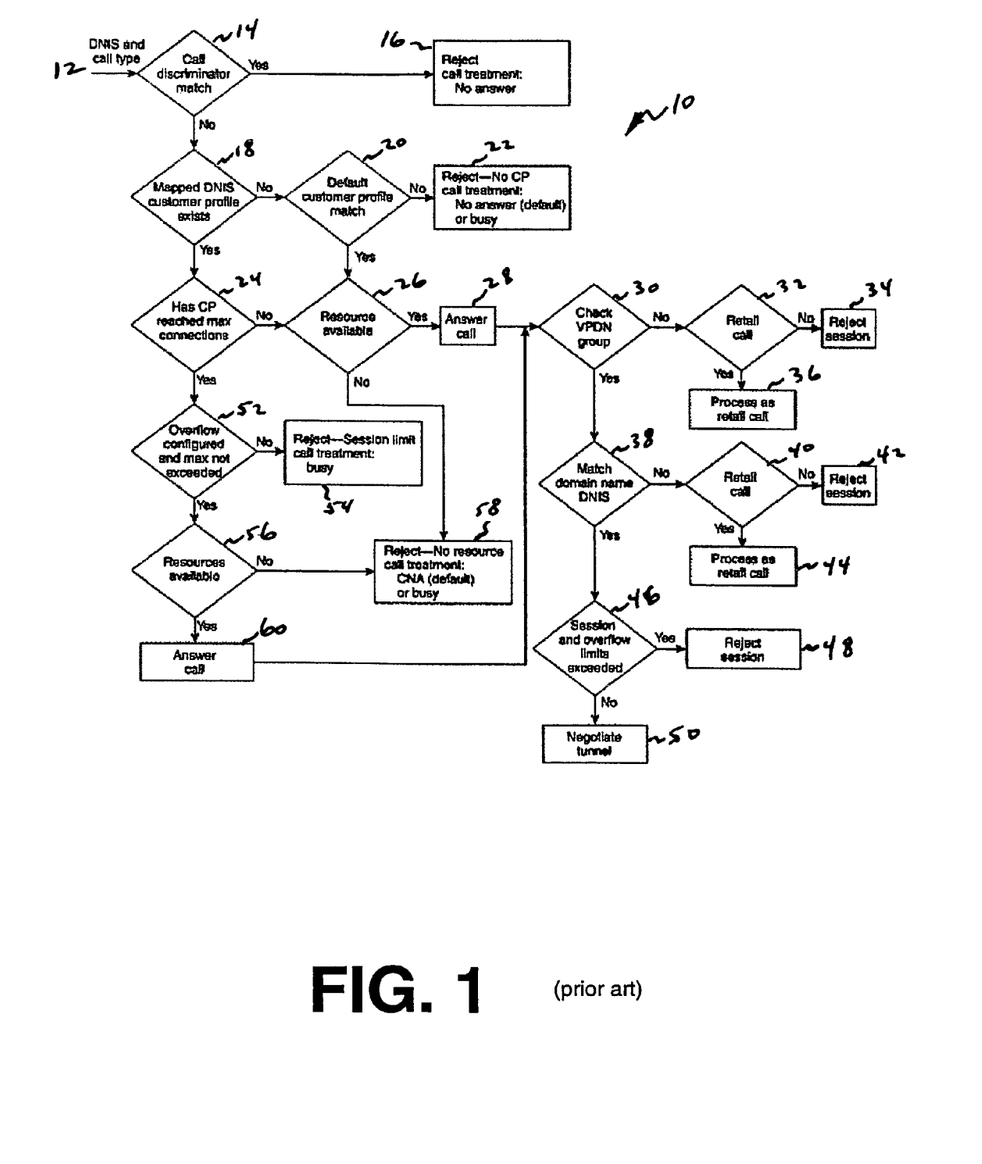
FIG. 1 is a flowchart illustrating the conventional RPMS logic for responding to a call.

If the call does not match the VPDN group, a first retail query is performed 32, and if refused, the call is rejected 34. If retail is accepted, the call is processed at retail cost 36. If the call matches the VPDN group, the domain name in the DNIS is queried 38. If the domain name does not match, a second retail query is performed 40. If refused, the call is rejected 42, and if accepted the call is processed at retail cost 44. If the domain name query 38 matches, the session and overflow thresholds are queried 46. If the thresholds are exceeded, the call is rejected 48, and if not a tunnel is negotiated 50.

Returning to the maximum connections query 24, if the connection threshold has been reached, the overflow availability is queried 52, and if exceeded, the call may be rejected 54. If availability exists, the availability of resources is queried 56. If the resources available queries 26 or 56 are negative, the call may be rejected 58. If resources are available, the call is answered 60, with continued procedures to the VPDN group verification query 30, and so forth.

Figure 2A:
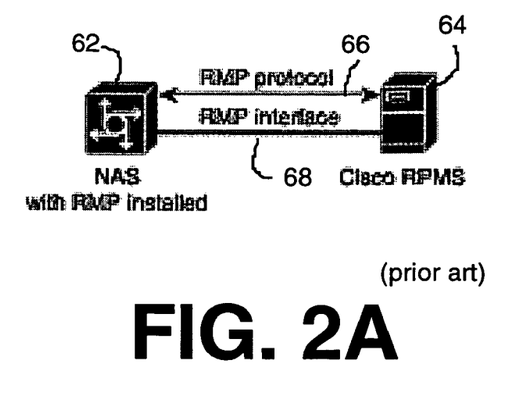
FIG. 2A is a diagram illustrating a conventional connection between a NAS and a RPMS.

The RPMS enables shared resources to be used across multiple NASes for various resource allocation schemes (performing session counting on a group level). For example, NAS resource groups may be combined with different modem services and call types (such as speech or digital) into resource data assignments. Resource groups may be configured on the NAS and assigned by the RPMS based on customer requirements. The RPMS may use resource management protocol (RMP) software to communicate with the NAS. An illustration of this arrangement is illustrated in FIG. 2A, in which a NAS 62 is featured with RMP installed and connected to a RPMS 64 via a RMP interface 66. The call type-DNIS information transmitted to the RPMS 64 and the approval or rejection response received by the NAS 30 are transferred through the RMP interface 66 using the RMP protocol 68.

The RPMS may be composed of a server platform with appropriate RMP software, along with a Distributed Session Manager (DSM) library installed and linked to the server platform. A RPMS may be a scalable performance architecture (SPARC) hardware platform equipped with DSM software and connected to a database in a memory device physically distinct from the RPMS. The DSM represents a linked library to the RPMS to keep accounting data records for the RPMS, and it maintains session states across multiple servers. The database may hold the customer profiles, system configurations and other desired instrumentation.

A local AAA server may be used in a network architecture incorporating a RPMS for the purpose of tracking users that access the network through calling line identification (CLID) and for creating records of the accounting data related to such users from outside the data communications network. The RPMS may communicate with a local AAA server using an internet authentication protocol, such as Terminal Access Controller Access Control System Plus (TACACS+) or Remote Access Dial-In User Service (RADIUS). In the absence of a local AAA server, the RPMS may provide only DNIS-based wholesale VPDN dial services under the domain name, and a remote AAA server may be used for user call tracking and management. When the call ends, the record for billing purposes may be sent to a report manager server.

As calls are received, the primary RPMS checks session counts to perform session management. These local counts are sent to the backup RPMS for synchronization. When the session counts approach a session limit, the primary RPMS reverses the exchange to get the session count from the backup RPMS for each call, thereby ensuring that an accurate session count is maintained and prevents more users from accessing the network than are permitted, a condition called "over-subscription". However, this exchange may reduce performance when the customer profile approaches its session limit for resource allocation.

Figure 2B:
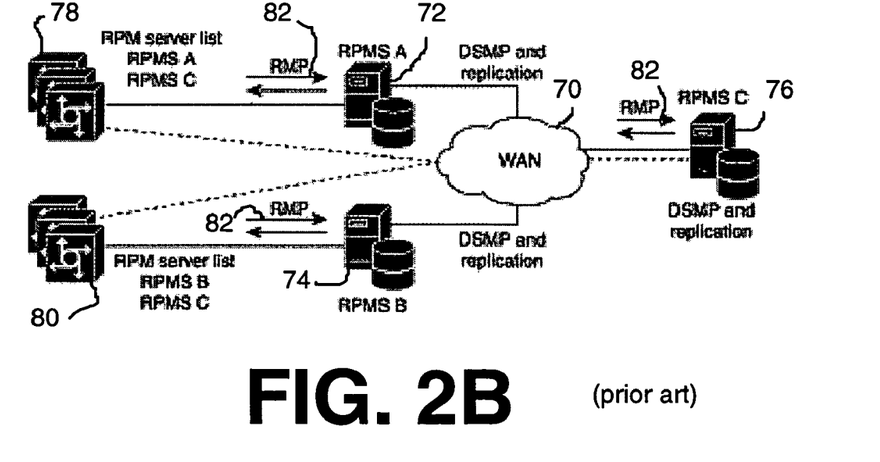
FIG. 2B is a diagram illustrating the maintenance of server lists in conjunction with primary RPMS systems and a backup RPMS in accordance with the prior art.

A client NAS may be configured with a list of RPMSes from which to attempt contacting a server on the fail-over list. The message data may be exchanged between a the NAS and the server by the RMP. If the NAS cannot reach the first server on the list, it tries to contact the next server, and so forth. In a typical configuration, the primary RPMS would be first on the list, and the backup RPMS would be the second on the list, with no third server listed. An illustration of this list's use by multiple NASes is depicted in FIG. 2B in which a wide area network (WAN) 70 is connected to a first RPMS labeled "A" 72, a second RPMS labeled "B" 74, both independent of each other, and a backup RPMS labeled "C" 76. A first NAS stack 78 with a first server list for RPMSes "A" and "C" is connected to RPMS "A" 72. A second NAS stack 80 with a second list for RPMSes "B" and "C" is connected to RPMS "B" 74. The NAS stacks 78 and 80 are connected to their respective local RPMSes "A" 72 and "B" 74, respectively through RMP 82, and via the WAN 70 to RPMS "C" 76. If RPMS "A" 72 fails, the first list on the first NAS stack 78 would "roll over" or transfer resource management to RPMS "C" 76. Similarly, if RPMS "B" 74 fails, the second list on the NAS stack 80 would likewise proceed to RPMS "C" 76.

However, if the backup RPMS lacks the information for call reconstruction, current calls may be discontinued.

In the event that either the primary RPMS or its database is unreachable, the call may be interrupted while the NAS initiates a timing switch. If the call is not restored, the switch times out, causing the call to be dropped from the NAS and a busy signal sent to the call-in user. Incorporation of a backup RPMS might initiate new user calls begun subsequent to the primary RPMS access failure, but absent a mechanism to restore the interrupted calls, the continuity of service for previous users would not be feasible. To avoid interruption of a call, the primary and backup servers must be in communication with each other and share information about a call's context as it is updated, thereby consuming valuable communication bandwidth.

SUMMARY OF THE INVENTION

A method and apparatus for network server recovery maintains an ongoing call by reconstructing its call context from a server-state attribute (SSA) that is generated by a first server, recorded in separate storage and retrieved by a second server in the event that a connection to the first server is interrupted. The SSA encodes call data that can be used to enable a server to maintain the call. The separate storage is preferably associated with a network access server (NAS) that does not itself use the SSA.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of the within disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herein.

The present invention relates to a method and apparatus to enable a backup server to reconstruct the context of an active call from a network call-in user connected to the network server after the connection to the primary server and/or its database has been severed or interrupted. Simply stated, this context may be restored from an updated data string constructed by the primary server and held in storage by a memory associated with the network server. This memory may be a separate memory device connected to and used by the network server, or may be a memory cache within the network server during its operation. In the within disclosure, the primary server may be represented by a local RPMS, the secondary server may be represented by a backup RPMS, and the network server may be represented by a NAS.

The data string may be constructed as a coded message from the primary server to the network server that the latter may store in associated memory but not need. This data string may include accounting information and may be updated periodically. When the network connection to the primary server has been unexpectedly severed from the network user as in a server or database failure (either of which may be considered a local server failure for the purposes of this invention), the backup server may query the network server to provide the data string from its associated memory, reconstruct the relevant information for the active calls before the timing switch signals a time-out and disconnects the user from the network.

In accordance with an embodiment of the invention, a redundant backup server processes messages for a "call" that began its processing on a primary server. A single RPMS backup server may support multiple local RPMSes. The RPMS backup server may provide a backup configuration and backup counters in case the local RPMS server becomes unavailable. To avoid interruption of a call, the data string transfer from the primary server to the backup server must occur in a manner transparent to the call-in user when a client NAS determines that the primary server is unreachable and switches or "rolls-over" to communicate with the backup server.

Since the NAS maintains data for each active call on its ports, an information packet constituting an "opaque" value may be stored that represents a "don't care" register with respect to the NAS, along with its own call data to make available to a server as needed. The opaque value, called the "server-state" attribute (SSA), contains context data that the server generates and updates for each active call, but may remain unused by the NAS. Since the service-state attribute may be produced from an aggregation of data elements in a specific sequence, this construction of the information packet called the SSA may be described as an encoding or "deparsing" procedure. The SSA value may contain particular call data that the server assembles from its call attribute table to describe the call and may be sent back to a memory separate from the server with each response message to the NAS. In the preferred embodiment, that memory may be associated with (that is, connected to) the NAS. The NAS updates its call attribute table to store the information packet referred to as the SSA. Hence, the SSA stored in the NAS acts as a tether to the information a backup server requires to continue processing a call without the need for another server to continuously exchange data with the backup server, thereby saving communication bandwidth.

When the NAS needs to communicate with the server concerning a particular active call, it may send the SSA along with the message, or it may provide the SSA if a server requests it. The contents of the SSA may be proprietary to the server and may be composed, in essence, of a condensed snapshot of the server's active call data as the call moves through its states until the call is terminated. The data fields containing the call data parameters may be separated by a particular character, such as commas, for delimiting fields. Other characters besides commas may be used as delimiters, as is trivially known to those with ordinary skill in the art.

If a server (such as a RPMS) receives a message from a memory storage such as a NAS for an active call that the server lacks in its call attribute tables, that server can obtain the SSA from the NAS. The server can then parse the SSA to "reconstruct" the context of the call in its call attribute tables and subsequently provide a response to the NAS. An example of this circumstance might occur if the NAS rolls over to communicate with the backup server from a failed primary server. The backup server would query the NAS for the SSA of a call originated during the operation of the primary server. After the call context reconstruction, the backup server provides the response to the NAS originally intended to be supplied by the primary server. The active call data continue to be available for billing and reports (such as for a local AAA server or in support of VPDN dial services), so that a meaningful call detail record may be generated when the call closes. Session and resource counts may be maintained by the backup server and restored to the primary server when the primary server becomes available.

This procedure reduces network traffic and increases system efficiency since the primary server need not feed a separate message to the backup server for each change in call context. With the connection between the servers and the NAS already established, the SSA may be embedded in messages that are being passed from the NAS and server for their normal business so the overhead of primary/backup communication, such as generating headers, opening connections, etc., may be completely eliminated. The NAS may be used as the instrument of storage for the server's call data in the event of a local server failure and only contains the latest data set for a call that is open. Otherwise, a more elaborate scheme would have to be devised between the primary and backup servers to ensure that active call data are current (meaning updated regularly) and free of "zombie" sessions, meaning inactive calls without a termination message.

Both primary and secondary databases may hold the customer profiles and system configurations. A RPMS may utilize database replication to ensure that databases running on geographically distributed primary RPMS installations contain the same customer profile information.

Figure 3:
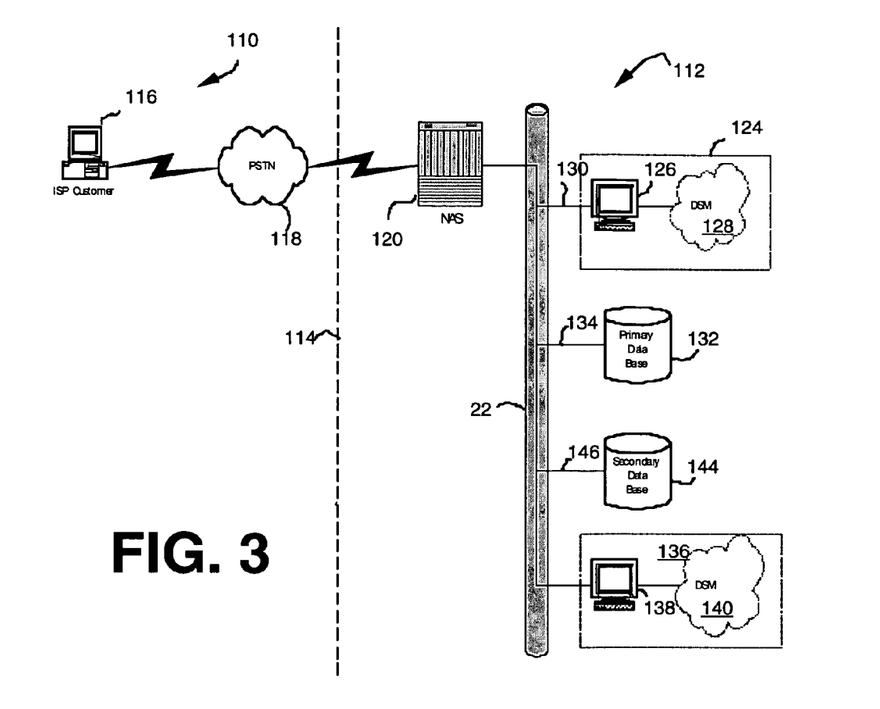
FIG. 3 is a diagram illustrating a network having a primary RPMS and a backup RPMS in accordance with a presently preferred embodiment of the present invention.

FIG. 3 illustrates an example configuration of a hypothetical redundant configuration incorporating the present invention. The network depicts an outside world 110 and the server group 112 sharing a telephone demarcation line 114. A call-in user or customer 116 on an ISP may be connected through a PSTN 118 in the outside world 110 across the demarcation line 114 to a NAS 120 in the server group 112. The NAS 120 may be connected to an Ethernet 122 that accesses other servers. While only a single NAS 120 is depicted in FIG. 3, more than one NAS 120 can be accommodated by the RPMS system in the server group 112. The primary or local RPMS 124 may be represented by a computer workstation 126 with a master DSM library 128, connected to the Ethernet 122 by means of a first port line 130. A primary database 132 may be dedicated to the primary or local RPMS 124 and be connected to the Ethernet 122 by a second port line 134. In this example configuration, only a single primary or local RPMS 124 is exhibited rather than several.

A secondary or backup RPMS 136 may be represented by a workstation 138 with a slave DSM library 140, connected to the Ethernet 122 by means of a third port line 142. A secondary database 144 may be dedicated to the secondary or backup RPMS 136 and be connected to the Ethernet 122 by a second port line 146.

If a primary or local RPMS 124 fails, loses its network connection 130 or is cut off from access to its master DSM library 128, the primary or local RPMS 124 will be isolated. With no information going in or out of the primary or local RPMS 124, the switch will timeout pending transactions. The administrator will need to re-establish connectivity for the ISP customer 116 in short order. In the meantime, the NAS 120 will use the secondary or backup RPMS 136 for authorizations and accounting. When connectivity is restored, the secondary or backup RPMS 136 will attempt to recreate call information from the NAS 120 when requests for that call are received.

For example, the NAS 120 authorized a call with the primary or local RPMS 124 that then lost network connectivity. The NAS 120 will attempt to send accounting updates to the primary or local RPMS 124 and fail, then roll over to the secondary or backup RPMS 136. If in the meantime the primary or local RPMS 124 comes back on line and the ISP customer 116 hangs up, the NAS 120 will send a resource-freed signal to the primary or local RPMS 124 which will then attempt to recreate the call context and free the necessary counters.

In the event that the secondary or backup RPMS 136 fails, it cannot be updated on the current counts. During this period and until all calls are closed that were active at the time it went down, the counts may be underreported. While in this state, the potential for over-subscription exists. When the secondary or backup RPMS 136 is brought back online, all counts from each primary or local RPMS 124 are transmitted to the secondary or backup RPMS 136 where they are aggregated to reflect counts for the entire network server group 112.

Figure 4:
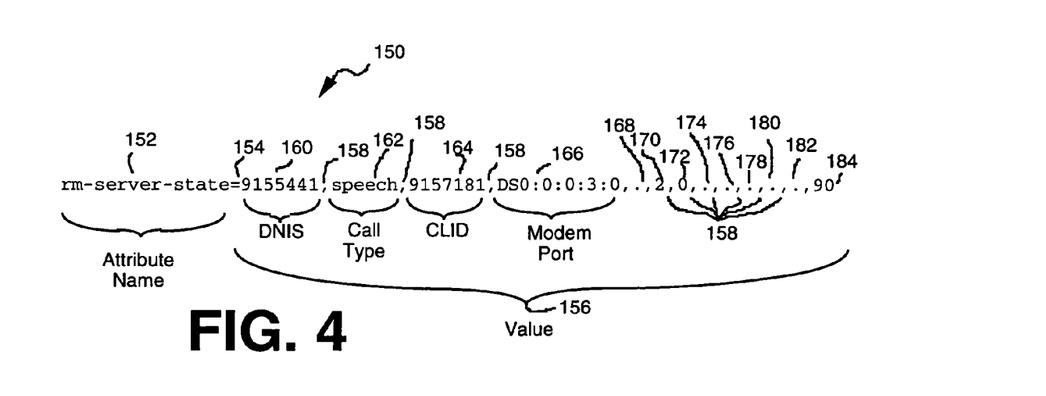
FIG. 4 is a diagram illustrating an example server-state attribute data string in accordance with a presently preferred embodiment of the present invention.

An example of a comma-delimited string representing the SSA can be seen in FIG. 4 in which the data from the string can be used to reconstruct the call information needed to maintain the connection through a RPMS. The example SSA and its syntax as an attribute/value pair in the NAS can be seen in the data string 150. The attribute/value pair may conform to TACACS+ or RADIUS or other such internet authentication protocol well known to those skilled in the art. The left segment may be the name 152 included in the attribute, which is depicted with an identifier prefix of "Name "rm-server-state"" in this example, separated from the right segment by a delimiter 154 shown as an equal sign. The right segment is the value 156, which is further subdivided into alphanumeric parameters that may be called "tokens" and separated by commas 158.

The value 156 begins with a first DNIS address 160 represented by a seven-digit integer. The second entry is the call type 162, which here is identified as "speech" followed by the third entry of CLID 164 represented by a seven-digit integer. The fourth entry is the modem port 166 represented by a five-field colon-separated parameter. The fifth entry is the resource group name 168 depicted by a period. The sixth and seventh entries are the call count 170 and the overflow count 172, each represented by an integer. The eighth, ninth, tenth, eleventh and twelfth entries, each denoted by a period and separated by commas 158, represent the start time 174, reference number 176, service group name 178, modem-tx-speed 180 and modem-rx-speed 182, respectively. The thirteenth entry represents the VPDN group name 184.

The data contained in the SSA data string 150 include information that cannot be obtained from the NAS administration call-status request. Source code to read the call data into the SSA and reconstruct the call information from the contents of the SSA may be written in Java language, although other programming languages are readily available to persons having ordinary skill in the art. To construct the SSA data string 150, the call data may appended together, separating each segment or token by a delimiter character such as a comma 158. For reading the SSA data string 150, each token may be read sequentially as a character string with the end of the token being determined by the presence of a delimiter character. The character string thus read may be placed into a string buffer to be written onto its appropriate data-field.

When an interruption between the NAS and its primary server occurs, the backup server issues an active-call petition to the NAS for the SSA data string 150. Once received, the server-state reconstruction subroutine in the backup server parses the SSA data-string 150 into the appropriate data functionalities. The code may check for the number of tokens in the data string to verify its completeness. The code may then sequentially place the character string of the token into a string buffer and write that character string from the string buffer to the corresponding data-field. This process may continue until each data-field has received an appropriate character string, whether read from the SSA data string or assigned by a default mechanism.

Figure 5:
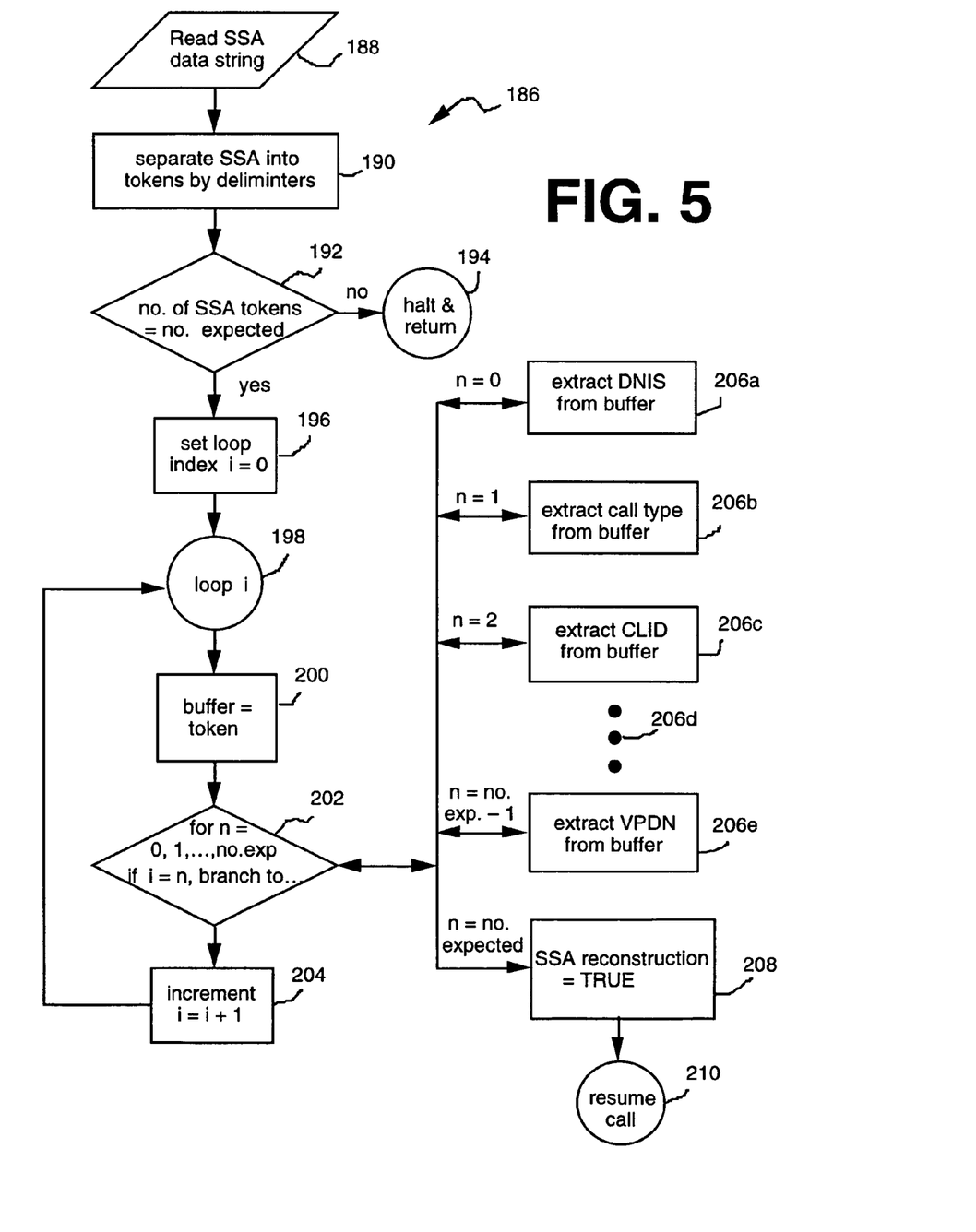
FIG. 5 is a process flow diagram illustrating the reconstruction of a data string in accordance with a presently preferred embodiment of the present invention.

Such a process is described in the process flow diagram of FIG. 5, in which the tokens comprising the SSA data string are sequentially read and written onto to appropriate data-fields that describe the call attributes. Upon receiving the SSA data string, the subroutine 186 in the code reads the data string at reference 188. Using the delimiters as markers, the data string is separated into tokens at reference 190, with the number of tokens counted. The token number may be compared to the number expected $n_{exp}$ as a read-error-detection tool at reference 192. If the number of tokens read is not equal to the number expected $n_{exp}$, the subroutine may halt for further instructions at reference 194. Assuming the two numbers are equal, a sequencing "loop" may be initiated at reference 196 with an example starting value of zero for the loop index i. The loop is then sequenced in sequencer 198 with the character string in the token placed in the buffer at reference 200. The loop index i may then be compared to a task value n, for a series of tasks n=0, 1, 2, ..., $n_{exp}$-1 at reference 202 with the process branching or diverting accordingly to the appropriate data-assigning task that corresponds to the value of the loop index (i=n). Once the task associated with the loop index equaling the task value (i=n) has been completed, the loop index may be incremented at reference 204, in this example by one (i=i+1), and the loop sequencing process continued to compare the loop index with the subsequent task value.

Each task to write the contents of the buffer to a data-field corresponds to a particular task value, and the process branches to the task when the loop index equals the corresponding task value. If the loop index equals zero (i=0) the DNIS may be extracted from the buffer and written to the DNIS data-field at reference 206a. If the loop index equals one (i=1), the call type may be extracted from the buffer and written to the call type data-field at reference 206b. If the loop index equals two (i=2), the CLID may be extracted from the buffer and written to the CLID data-field at reference 206c, and so forth shown as continuing steps 206d. If the loop index reaches one less than the number expected (i=$n_{exp}$-1), the VPDN may be extracted from the buffer and written to the VPDN data-field at reference 206e. Once completed, the incremented loop index equals the number expected (i=$n_{exp}$) and the completed condition is assigned the logic value of TRUE at reference 208, whereas the default prior to this would be FALSE. Once the data-fields are completed, the attribute information for the call is available and the call may be resumed by the server at reference 210.

Figure 6:
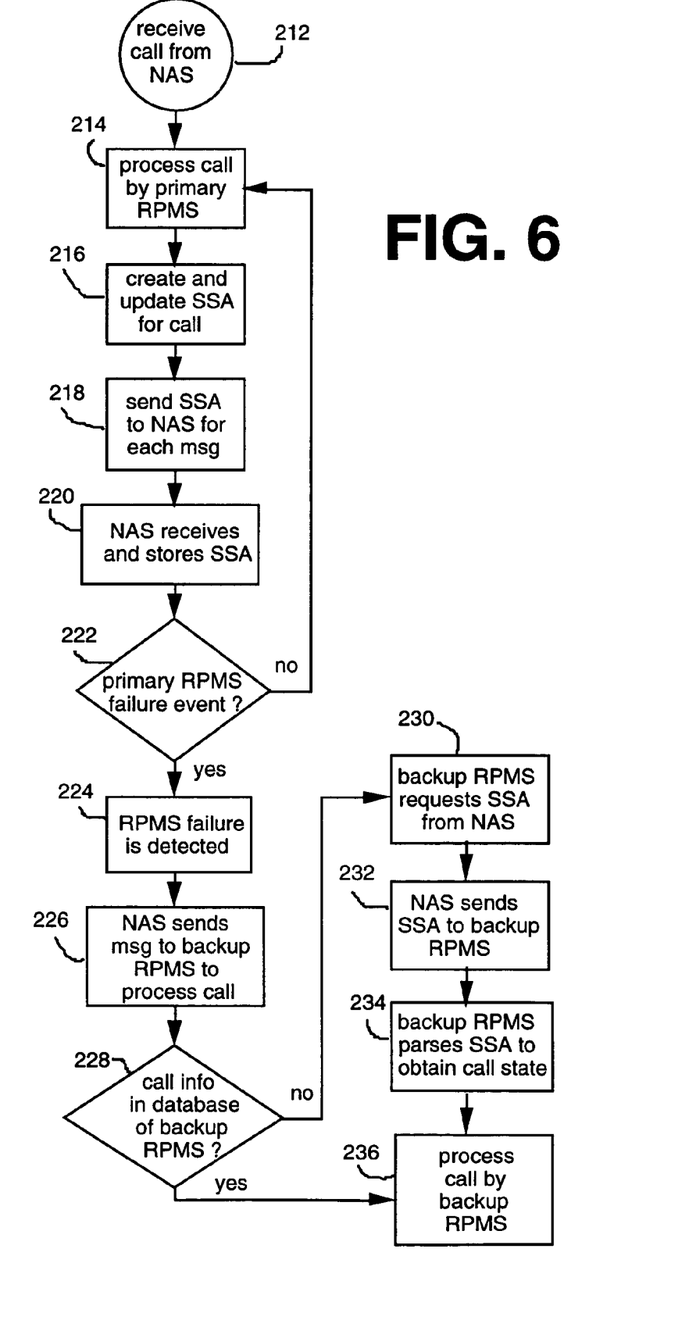
FIG. 6 is a process flow diagram illustrating server failure response in accordance with a presently preferred embodiment of the present invention.

The overall process for a backup server responding to a local server failure is summarized in the process flow diagram of FIG. 6. The network roll-over process may begin with a call being received by the NAS from a user at reference 212. The call is processed by the primary server at reference 214, wherein the server's function is performed by a primary RPMS. The call attributes are coded in a SSA, which is created and updated for characterizing the call at reference 216. This function is typically performed by the RPMS. The SSA may be included with each message sent to the NAS from the RPMS at reference 218. The NAS then receives and stores the SSA in memory at reference 220 for subsequent retrieval if needed.

A detector for alerting the NAS of a server failure may be employed at reference 222 to determine if the primary RPMS is still linked to the network. In the event that no failure has occurred, indicating that the primary RPMS is still functioning, the call continues to be processed by the primary RPMS at reference 214. However, if such a failure has occurred, this condition may be detected at reference 224, and the NAS responds by sending a message to the secondary server, in this case a backup RPMS, to continue processing the call at reference 226. The backup RPMS checks its database to determine if the call attribute information is available at reference 228. If not, the backup RPMS requests the NAS to provide the SSA at reference 230. The NAS sends the SSA to the backup RPMS at reference 232, and the backup RPMS then parses the SSA at reference 234 to obtain the latest call attribute information it requires. The backup RPMS then proceeds to process the call at reference 236. If the check by the backup RPMS for call attribute information determines the information's availability at reference 228, then the backup RPMS need not query the NAS and may proceed directly to process the call at reference 236. The steps 216, 218 and 220 provided through the primary RPMS processing of the call at reference 214 may also be continued by the backup RPMS processing of the call at reference 236.

While embodiments and applications of the invention have been shown and described, it would be apparent to those of ordinary skill in the art having the benefit of this disclosure, that many more modifications than mentioned above are possible without departing from the inventive concepts herein. The invention, therefore, is not to be restricted except in the spirit of the appended claims.

What is claimed is:

1. A backup server for enabling a data communications network to recover from a local server failure, the backup server comprising:
    an information packet requester configured to request an information packet from a memory associated with the a network access server (NAS) in response to a call received from the NAS, if the call information is not available to the backup server, the information packet associated with an ongoing call placed by a call-in user via the NAS, the information packet containing call information for maintaining connection of the ongoing call if the local server fails;
    an encoder associated with the local server and configured to generate an information packet associated with an ongoing call placed by the call-in user via the NAS, wherein the information packet containing call information for maintaining connection of the ongoing call if the local server fails;
    a sender configured to transmit for transmitting the information packet from the encoder to a memory associated with the NAS, the information packet being stored in the memory;
    a call coupler associated with the NAS and configured to couple for coupling the call to the local server if the local server does not fail, the call coupler further configured to couple and for coupling the call to the backup server if the local server fails;
    an information packet receiver responsive to the local server failure, the information packet receiver receiving the information packet from a memory associated with a network access server (NAS), the NAS configured to couple capable of coupling a call placed from the call-in user to the data communications network and providing a network connection to the local server; and
    a parser configured to reconstruct for reconstructing the call information from the information packet, such that the backup server maintains the ongoing call to the data communications network.

2. A backup server according to claim 1, wherein the call information comprises server-state attribute (SSA) having an attribute/value pair that can be parsed into a plurality of separate data entries.

3. A backup server according to claim 1, wherein the information packet further comprises a plurality of aggregated data elements from a call attribute table.

4. A backup server according to claim 3, wherein the plurality of aggregated data elements are separated by the parser for reconstructing the call information from the information packet.

5. A backup server according to claim 1, wherein the call information comprises at least one of:
    Dialed Number Information Service (DNIS) address;
    call type;
    Calling Line Identification (CLID); and service accounting information.

6. A system for maintaining a call placed by a call-in user to a data communications network, the system comprising:
    a memory associated to a network access server (NAS), the NAS configured to couple capable of coupling a call placed from the call-in user to the data communications network and providing a network connection to a local server;
    an encoder associated with the local server and configured to generate an information packet associated with an ongoing call placed by the call-in user via the NAS, wherein the information packet containing call information for maintaining connection of the ongoing call if the local server fails;
    a sender configured to transmit for transmitting the information packet from the encoder to a memory associated with the NAS, the information packet being stored in the memory;
    a call coupler associated with the NAS and configured to couple for coupling the call to the local server if the local server does not fail, the call coupler further configured to couple and for coupling the call to the backup server if the local server fails;
    an information packet forwarder configured to transmit for transmitting the information packet from the associated memory to the backup server if the local server fails the information packet forwarder further comprising an information packet requester associated with the backup server for requesting the information packet from the memory associated with the NAS in response to the call received from the NAS, if the call information is not available to the backup server; and a parser associated with the backup server and configured to reconstruct for reconstructing the call information from the information packet such that the backup server can recover the call information and serve the call without disconnecting the user from the network.

7. A system according to claim 6, wherein the information packet forwarder further comprises:

an information packet sender associated with the NAS and configured to transmit for transmitting the information packet in response to a request from the information packet requester.

8. A system according to claim 6, wherein the call information comprises at least one of:

Dialed Number Information Service (DNIS) address;
call type;
Calling Line Identification (CLID); and
service accounting information.

9. A server backup system for maintaining an ongoing call placed by a call-in user to a network, the system comprising:

a backup server connected to the network, the backup server configured to service of servicing the call;

an encoder associated with a server servicing the call, the encoder generating an information packet associated with an ongoing call placed by the call-in user via a network access server (NAS) configured to couple capable of coupling the call from the user to the network, the NAS further configured to provide and providing a network connection to the server, the information packet containing call information for maintaining connection of the ongoing call;

a sender associated with the server, the sender configured to transmit transmitting the information packet to a memory associated with the NAS, the memory configured to store~the information packet;

a call coupler associated with the NAS, the call coupler configured to roll~over the call to the backup server if the server fails;

an information packet requester associated with the backup server, the information packet requester configured to request for requesting the information packet from the memory associated with the NAS in response to the call received from the NAS, if the call information is not available to the backup server; and a parser associated with the backup server and configured to reconstruct, for reconstructing the call information from the information packet.

10. A server backup system according to claim 9, wherein the call information comprises server-state attribute data having an attribute/value pair that can be parsed into a plurality of separate data entries.

11. A server backup system according to claim 9, wherein the information packet further comprises a plurality of aggregated data elements from a call attribute table.

12. A server backup system according to claim 11, wherein the plurality of aggregated data elements of the information packet are separated by the parser for reconstructing the call information from the information packet.

13. A server backup system according to claim 9, wherein the server is a resource pool manager server (RPMS).

14. A server backup system according to claim 9, further comprising: a failure detector associated with the NAS; and configured to detect for detecting the failure of the server.

15. A server backup system according to claim 9, wherein the call information comprises at least one of:

Dialed Number Information Service (DNIS) address;
call type;
Calling Line Identification (CLID); and
service accounting information.

16. A server backup system for maintaining an ongoing call placed by a call-in user to a network, the system comprising:

a first server connected to the network and configured to service for servicing the call; a second server connected to the network and configured to service for servicing the call if the first server fails; and a network access server (NAS) configured to couple capable of coupling a call placed by a call-in user to the network and providing a network connection to a server, the NAS coupling the call from the call-in user to the first server if the first server does not fail, and coupling the call to the second server if the first server fails, the NAS including a memory associated therewith, wherein the first server comprises:

an encoder configured to generate for generating an information packet associated with an ongoing call placed by the call-in user via the NAS, the information packet containing call information for maintaining connection of the ongoing call if the first server fails; and a sender configured to transmit for transmitting the information packet from the encoder to the memory associated with the NAS, the memory storing the information packet, and wherein the second server comprises:

an information packet requester configured to request for requesting the information packet from the memory in response to the call received from the NAS, if the call information is not available to the second server; and a parser configured to reconstruct for reconstructing the call information from the information packet.

17. A server backup system according to claim 16, wherein the NAS further comprises:

a failure detector configured to detect for detecting the failure of the second server.

18. A server backup system according to claim 16, wherein the first server is a resource pool manager server (RPMS) and the second server is a backup RPMS.

19. A server backup system according to claim 16, wherein the call information comprises at least one of:

Dialed Number Information Service (DNIS) address;
call type;
Calling Line Identification (CLID); and
service accounting information.

20. A method performed by backup server for enabling a data communications network to recover from a local server failure, the method comprising:

if the local server fails and if an information packet associated with an ongoing call placed by a call-in user is not available, requesting the information packet from a memory associated with a network access server (NAS) in response to a call placed from the call-in user to the data communications network, the information packet containing call information for maintaining connection of the ongoing call if the local server fails;

receiving the an information packet from the a memory in response to the a local server failure, the NAS configured to couple capable of coupling a call placed from a call-in user to the data communications network, the NAS further configured to provide and providing a network connection to a local server; and reconstructing the call information from the information packet so as to maintain the ongoing call to the data communications network.

21. A method according to claim 20, wherein the call information comprises server-state attribute (SSA) data having an attribute/value pair, the reconstructing comprising:
  parsing the SSA data into a plurality of separate data entries.
22. A method according to claim 21, further comprising:
  petitioning to the NAS for the information packet after the NAS requests the call information; and
  sending the call information to the NAS after completing the reconstructing.
23. A method for maintaining a call placed by a call-in user to a data communications network, the method comprising:
  generating an information packet associated with an ongoing call placed by the call-in user via a network access server (NAS), wherein the information packet containing call information of an ongoing call for maintaining connection of the call if the local server fails;
  transmitting the information packet to the memory associated with the NAS, the information packet being stored in a memory associated with the NAS, the NAS configured to the call-in user to the data communications network and providing a network connection to the local server; coupling the call to the local server if the local server does not fail, and coupling the call to the backup server if the local server fails;
  transmitting the information packet from the memory associated with NAS to the backup server via an information packet requester associated with the backup server if the local server fails and the information is not available to the backup server; and
  reconstructing the call information from the information packet such that the backup server can recover the call context and serve the ongoing call without disconnecting the user from the network.
24. An apparatus for enabling a data communications network to recover from a local server failure, the data communications network including a network access server (NAS) configured to couple capable of coupling a call placed from a call-in user to the data communications network and providing a network connection to the local server, the NAS having a memory associated therewith, the apparatus comprising:
  means for, if the local server fails and if an information packet associated with an ongoing call placed by a call-in user is not available, requesting the information packet from a memory associated with a network access server (NAS) in response to a call placed from the call-in user to the data communications network, the information packet containing call information for maintaining connection of the ongoing call if the local server fails;
  means for receiving the an information packet from the a memory associated in response to the a local server failure, the NAS configured to couple a call placed from a call-in user to the data communications network, the NAS further configured to provide and providing a network connection to a local server; and
  means for reconstructing the call information from the information packet so as to maintain the ongoing call to the data communications network.
25. An apparatus according to claim 24, wherein the call information comprises server-state attribute (SSA) data having an attribute/value pair, the means for reconstructing comprising:
  means for parsing the SSA data into a plurality of separate data entries.
26. An apparatus according to claim 25, further comprising:
  means for petitioning to the NAS for the information packet after the NAS requests the call information; and
  means for sending the call information to the NAS after completing the reconstructing.

* * * * *